C. CARLTON & J. B. JONES.
BALL-VALVE.

No. 179,263.  Patented June 27, 1876.

WITNESSES:
John Goethals
Alfred Lurcott

INVENTOR:
C. Carlton
BY J. B. Jones

ATTORNEYS.

N. PETERS, PHOTO-LITHOGRAPHER, WASHINGTON, D. C.

UNITED STATES PATENT OFFICE.

CORTLAND CARLTON AND JOHN B. JONES, OF KALAMAZOO, MICHIGAN.

IMPROVEMENT IN BALL-VALVES.

Specification forming part of Letters Patent No. 179,263, dated June 27, 1876; application filed April 4, 1876.

*To all whom it may concern:*

Figure 1:
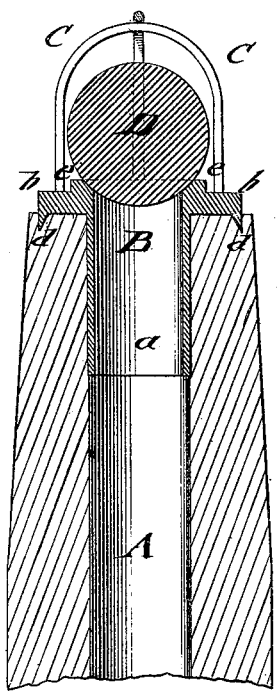
Figure 2:
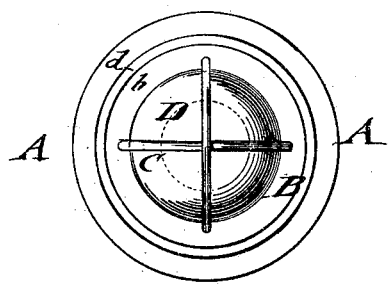

Be it known that we, CORTLAND CARLTON and JOHN B. JONES, of Kalamazoo, in the county of Kalamazoo and State of Michigan, have invented a new and Improved Valve, of which the following is a specification:

In the accompanying drawing, Figure 1 represents a vertical central section, and Fig. 2 a top view, of our improved valve.

Similar letters of reference indicate corresponding parts.

The invention relates to an improved ball-valve for wooden pumps, being intended to take the place of the commonly-used hinged leather valve, which frequently gets obstructed and out of order, so as to cause considerable annoyance by the unsatisfactory and imperfect working of the pump.

The invention consists of a ball-valve with metallic seat entering the wooden tubing, and being driven by a sharp circumferential flange into the end of the tubing.

In the drawing, A represents a wooden pump-tube, which is provided with a metallic seat, B, and wire cage C, to retain the rubber ball D. The metallic seat B is made with a downward-extending tube, $a$, that is fitted into the end of the wooden tubing. A ring-shaped top part of the seat B covers partly the top of the tubing, and is driven by its sharp downward-extending outer flange $d$ into the end of the wooden tube, to produce thereby an intimate connection of seat and pump-tube, and prevent any air from passing in between seat and tube. The top plate or ring of the seat has a raised, curved, or conically-tapering rim, $e$, at the inner circumference, which establishes the perfect seating of the rubber ball without admitting the settling of any impurities or obstructions thereon, that form a frequent source of the insufficient working of the common leather valves.

The rubber ball-valve and seat will be very durable and reliable, so that an efficient and more perfect pump is obtained.

Having thus described our invention, we claim as new and desire to secure by Letters Patent—

As an improvement in ball-valve for wooden pump-tubes, a metallic seat, made with a downward-extending tube fitting the pump-tube, a top plate or ring with outer wood-biting flange, and a raised interior rim and seat, substantially in the manner shown and described.

CORTLAND CARLTON.
JOHN B. JONES.

Witnesses:
M. WESTBROOK,
CHARLES H. BOOTH.